(12) United States Patent
Kaneko et al.

(10) Patent No.: US 11,132,813 B2
(45) Date of Patent: Sep. 28, 2021

(54) DISTANCE ESTIMATION APPARATUS AND METHOD

(71) Applicant: HITACHI, LTD., Tokyo (JP)

(72) Inventors: Alex Masuo Kaneko, Tokyo (JP); Kenjiro Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/630,088

(22) PCT Filed: Feb. 22, 2018

(86) PCT No.: PCT/JP2018/006399
§ 371 (c)(1),
(2) Date: Jan. 10, 2020

(87) PCT Pub. No.: WO2019/058582
PCT Pub. Date: Mar. 28, 2019

(65) Prior Publication Data
US 2020/0167950 A1    May 28, 2020

(30) Foreign Application Priority Data
Sep. 21, 2017 (JP) .............................. JP2017-181207

(51) Int. Cl.
*G06T 7/00* (2017.01)
*G06T 7/73* (2017.01)
(Continued)

(52) U.S. Cl.
CPC .................. *G06T 7/73* (2017.01); *G06T 7/10* (2017.01); *G06T 7/215* (2017.01); *G06T 2207/20164* (2013.01)

(58) Field of Classification Search
CPC ....... G06T 7/70–75; G06T 7/215; G06T 7/10; G06T 2207/20164
See application file for complete search history.

(56) References Cited

U.S. PATENT DOCUMENTS

2014/0152780 A1\* 6/2014 Kanetake ............. H04N 13/282
348/50
2016/0191795 A1\* 6/2016 Han ......................... B60R 1/00
348/36
(Continued)

FOREIGN PATENT DOCUMENTS

JP      2006-047091 A    2/2006
JP      2009-145230 A    7/2009
(Continued)

OTHER PUBLICATIONS

International Search Report of PCT/JP2018/006399 dated Apr. 17, 2018.

*Primary Examiner* — Sean T Motsinger
(74) *Attorney, Agent, or Firm* — Mattingly & Malur, PC

(57) ABSTRACT

A distance to an object is estimated with a monocular camera that estimates a distance from a moving object to feature points on an image from an imaging device mounted on the moving object. The distance estimator sets one or more feature points on the image acquired from the imaging device at a first timing and detects the feature point on the image acquired from the imaging device at a second timing. The distance estimator also determines the movement amount of the feature point on the image between the first timing and the second timing and determines the movement amount of the moving object between the first and second timings. The distance estimator then estimates the distance from the moving object to the feature point based on the movement amount on the image and the movement amount of the moving object between the first and second timings.

8 Claims, 7 Drawing Sheets

(51) Int. Cl.
  *G06T 7/215*  (2017.01)
  *G06T 7/10*  (2017.01)

(56) References Cited

U.S. PATENT DOCUMENTS

2017/0010623 A1 1/2017 Tang et al.
2020/0219281 A1* 7/2020 Ogata ........................ G06T 7/73

FOREIGN PATENT DOCUMENTS

JP   2009145230 A * 7/2009
JP   2016-148512 A  8/2016

* cited by examiner

DISTANCE ESTIMATION APPARATUS AND METHOD

TECHNICAL FIELD

The present invention relates to a distance estimation apparatus and a method of estimating a distance from a moving object, such as a robot and a car, to a surrounding object.

BACKGROUND ART

An autonomous traveling technology and a driving assistance technology have been developed in which a moving object, such as a robot or a car, estimates the current self-position and traveling state using collected surrounding information, and controls the traveling of the moving object.

In this case, various sensors, such as an imaging device (a camera and the like), a laser sensor, and a millimeter wave radar, are used to detect information around the moving object. Further, as a sensor for directly measuring a position of the moving object, global positioning system (GPS) or inertial measurement unit (IMU) is used.

Further, examples of control processing for achieving autonomous traveling include self-position estimation processing of the moving object, which is generally performed in combination with several methods. Examples of such methods include a calculation method (odometry) of a relative movement amount by integration of a velocity or an angular velocity of the moving object measured by IMU, and a GPS positioning method. Further, examples of methods of correcting the current position of the moving object include a map matching method with which a landmark, such as road surface paint or a sign, as a reference for position estimation, is detected by a laser sensor, a camera, or the like, and this detected position of the landmark is compared with map information.

Further, even in a situation without any map information, landmarks, or GPS available, a simultaneous localization and mapping (SLAM) method, which creates a map of the environment while estimating the relative position with an object around the moving object, is effective as a self-position estimation method.

Hereinafter, the SLAM processing using an image will be briefly described. First, an image (frame) around the moving object is acquired at a first timing, and a feature point of this acquired image is extracted by a feature extraction image processing technique. Next, a feature point of an image (frame) acquired at a second timing is similarly extracted, and a same point as the feature point extracted from the image at the first timing is tracked on the image acquired at the second timing. Then, using a movement amount of the tracked feature point on the image, the movement amount of the camera/self-position is estimated, and a map of the surrounding environment is created at the same time.

Here, a distance between the moving object and the feature point is required. When a stereo camera or a laser sensor is used to detect the surrounding information, the distance to the feature point can be directly calculated. However, a monocular camera (by which the distance cannot be directly calculated) is often used to detect the surrounding information in view of costs, processing complexity, processing speed, maintainability, and the like. In this case, a monocular stereo method is used, with which the detected feature point is tracked on a plurality of images (frames) and the distance between the moving object and the feature point is calculated by convergence calculation from time-series information, using, for example, a particle filter or a Kalman filter.

As a similar method, for example, in PTL 1, a method of estimating a monocular stereo distance from a moving object includes an imaging step of capturing an image, an optical flow calculation step of calculating an optical flow from an image center based on a plurality of images captured in time series, a velocity measurement step of measuring the velocity of the moving object, and a distance estimation step of estimating the distance to the object in the image based on the optical flow from the image center and the velocity of the moving object.

CITATION LIST

Patent Literature

PTL 1: JP 2016-148512 A

SUMMARY OF INVENTION

Technical Problem

However, in an estimation of the distance to the object with the monocular camera as in the example of PTL 1, when an error occurs in a position of the feature point on the image due to, for example, noise, a calculation processing error, or an image acquisition timing, an error in the distance to the feature point is large, and the calculation does not converge, takes long to converge, or converges with reduced distance accuracy.

Therefore, it is an object of the present invention to provide a distance estimation apparatus and method that, in an estimation of the distance to an object with a monocular camera, are capable of estimating the distance to the object with high accuracy by reducing an influence of any error in a position of a feature point on an image.

Solution to Problem

To solve the above problems, a distance estimation apparatus according to the present invention estimates a distance from a moving object to a feature point on an image, using an image from an imaging device mounted on the moving object. The distance estimation apparatus 1 includes a first means, a second means, a fourth means, a fifth means, and a sixth means. The first means sets one or a plurality of feature points on an image acquired from the imaging device at a first timing. The second means detects the feature point set at the first means on an image acquired from the imaging device at a second timing. The fourth means determines a movement amount of the feature point on the image between the first timing and the second timing. The fifth means determines the movement amount of the moving object between the first timing and the second timing. The sixth means estimates the distance from the moving object to the feature point based on the movement amount on the image and the movement amount of the moving object.

To solve the above problems, a distance estimation method according to the present invention estimates a distance from a moving object to a feature point on an image, using an image from an imaging device mounted on the moving object. The distance estimation method sets one or a plurality of feature points on the image acquired from the imaging device at a first timing. The method detects the feature point set at the first means on the image acquired from the imaging device at a second timing. The method determines the movement amount of the feature point on the image between the first timing and the second timing. The method determines a movement amount of the moving object between the first timing and the second timing. The method estimates the distance from the moving object to the feature point based on the movement amount on the image and the movement amount of the moving object between the first timing and the second timing.

Advantageous Effects of Invention

In the distance estimation apparatus and method of the present invention, a calculation can be stably performed and the distance to the object can be estimated with high accuracy by reducing the influence of an error even when influenced by various disturbances such as weather, a time or calculation error, or noise.

DESCRIPTION OF EMBODIMENT

Hereinafter, a distance estimation apparatus according to an embodiment of the present invention will be described with reference to the drawings.

Embodiment

Figure 1:
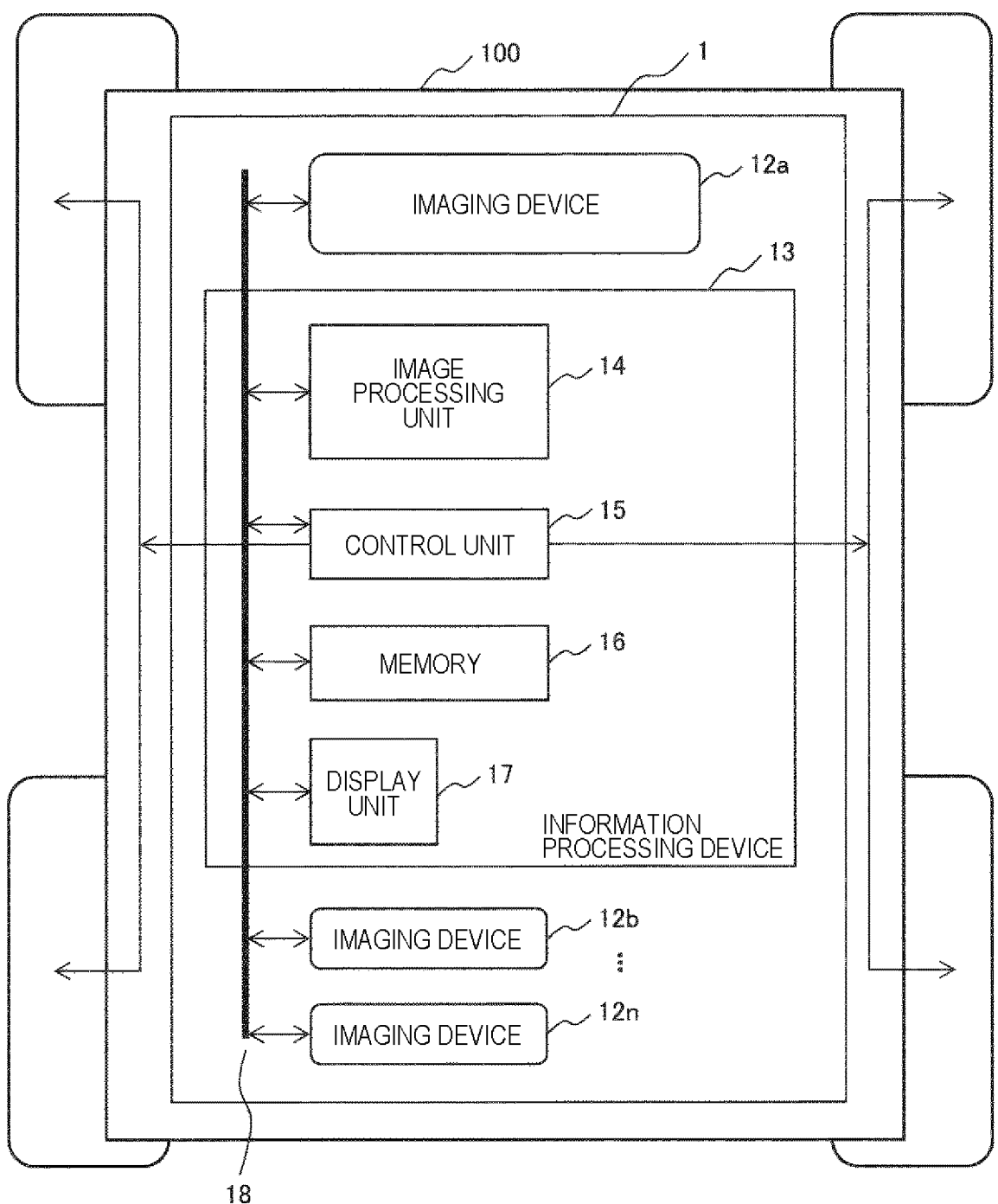
FIG. 1 is a diagram showing a configuration example of a distance estimation apparatus 1 according to an embodiment of the present invention.

FIG. 1 is a diagram showing a configuration example of a distance estimation apparatus 1 according to an embodiment of the present invention.

The distance estimation apparatus 1 is mounted on a moving object 100, such as a car or a robot. The distance estimation apparatus 1 includes one or more imaging devices (12a, 12b, ..., 12n) and an information processing device 13. The imaging device 12 may be, for example, a still camera or a video camera, and may be a monocular camera or a stereo camera.

The information processing device 13 in the distance estimation apparatus 1 processes an image captured by the imaging device 12 to calculate a distance to a surrounding object and a position or a movement amount of the moving object 100. The position or movement amount that has been calculated is used for displaying or controlling the moving object 100.

The information processing device 13 is, for example, a general computer, and includes an image processing unit 14 that processes an image captured by the imaging device 12, a control unit (CPU) 15 that performs processing based on an image processing result, a memory 16, a display unit 17, such as a display, and a bus 18 that interconnects these components. The image processing unit 14 and the control unit 15 execute a predetermined computer program. The information processing device 13 configured by a computer thereby performs various calculation processing.

The imaging device 12 may be one or more as long as the imaging device 12 is installed in the moving object 100 and is capable of continuously acquiring images around the moving object 100. A position of installing the imaging device 12a may be, for example, anywhere in a front part, a rear part, or a side part of the moving object 100. In a case where the imaging device 12 is installed in the front part of the moving object 100, the imaging device 12a may capture a distant view in front of the moving object 100 or a near view, such as a road surface (a white line or road surface paint) below the moving object 100. In a case where a plurality of imaging devices 12 is installed, the other imaging devices 12b to 12n may capture a same imaging direction or region as that of the imaging device 12a or may capture a different imaging direction or region from that of the imaging device 12a. Here, the imaging devices 12a to 12n are preferably installed under a condition that the imaging devices are not simultaneously affected by various disturbances, noises, and errors.

For example, when the imaging device 12a is installed in the front part of the moving object 100, facing forward, to reduce the influence of environmental disturbances (noise), such as rain and sunlight, the imaging device 12b is installed in the rear part of the moving object 100, facing rearward or downward. Thus, for example, even when the image captured by the imaging device 12a during rainfall is unclear due to the influence of raindrops, the image captured by the imaging device 12b is less susceptible to the effect of raindrops. Even when the image captured by the imaging device 12a is unclear due to the effect of sunlight (intense light from above), the image captured by the imaging device 12b is not affected.

The imaging devices 12a to 12n may capture images under different imaging conditions (e.g. aperture value and white balance). For example, by mounting an imaging device whose parameter is adjusted for a bright place and an imaging device whose parameter is adjusted for a dark place, imaging may not depend on the contrast of the environment, or imaging elements or lenses of various characteristics may be combined.

In addition, the imaging devices 12a to 12n may capture different imaging directions or regions. For example, the imaging device 12a captures a distant view in front of the moving object 100 so as to extract feature points, such as landmarks of a three-dimensional object, such as a building, a tree, or a sign. The imaging device 12b captures a near view, such as a road surface around the moving object 100, and a white line or road surface paint around the moving object 100 may be detected. Many feature points can be thereby extracted in the same time frame, and feature points that are not easily affected by the speed of the moving object or environmental disturbance can be captured.

Further, the imaging device 12 may be a stereo camera/compound eye camera in which a plurality of imaging devices is combined, or a monocular camera. When the imaging device 12 is a compound eye camera, the distance from the imaging device 12 to the feature point can be directly measured. When the imaging device 12 is a monocular camera, the relationship between the pixel position on the image and the actual position (x, y, z) is constant when the moving object travels on a flat road surface. Thus, the distance from the imaging device 12 (moving object 100) to the feature point can be geometrically calculated.

The imaging devices 12a to 12n automatically/continuously capture images when receiving a shooting command from the control unit 15, or at fixed time intervals. Since an error in acquisition time affects an error in the distance to the object and the position of the moving object 100, the error in imaging time is reduced further when images are captured automatically/continuously at fixed time intervals.

The memory 16 is configured by a main storage device (main memory) of the information processing device 13 and an auxiliary storage device, such as a storage, and stores data of an image captured by the imaging device 12 and an imaging time in the auxiliary storage device. The memory also stores information during calculation and calculation results of the image processing unit 14, the control unit 15, and the display unit 17. For example, the image processing unit 14 performs various image processing based on the image data and the imaging time stored in the memory 16 and stores an intermediate image in the process of calculation in the memory 16. Thus, the intermediate image can be used in other processing by the image processing unit 14, the control unit 15, and the display unit 17.

The bus 18 may be any bus as long as it can be used to transmit image information, and can be configured by, for example, inter equipment bus (IEBUS) (registered trademark), local interconnect network (LIN), or controller area network (CAN).

The image processing unit 14 extracts feature points of images (frames) acquired at different timings to track the same feature points. Then, the movement amount of the moving object 100 is calculated from the movement amount of the feature point on the image, and the movement amount of the moving object is added to a predetermined point (a known position of the moving object) to estimate the current position. Here, the position of the moving object 100 is estimated with high accuracy based on the movement amount of the feature point, the moving speed of the moving object 100, and the like, from a plurality of position candidates of the moving object calculated from a large number of feature points. In the present invention, estimating the position is synonymous with estimating the distance. Therefore, the fact that the position has been estimated means that the distance from the moving object, such as a robot or car, to the surrounding object has been estimated.

The control unit 15 outputs a command on the moving speed and direction to a drive unit and a steering unit (not shown) of the moving object 100 based on the result of the image processing in the image processing unit 14.

Figure 2:
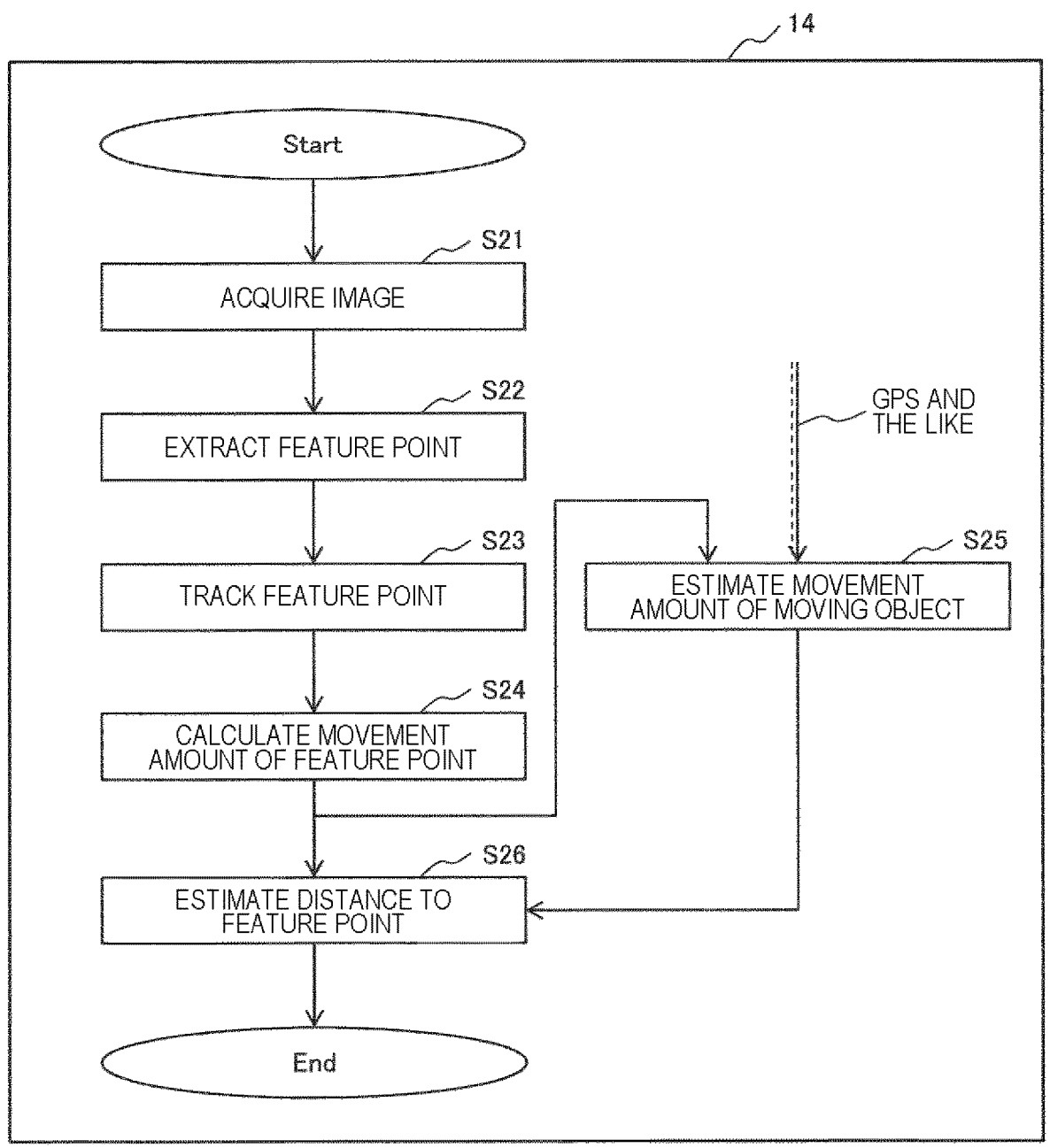
FIG. 2 is a flowchart showing a processing procedure performed by an image processing unit.

FIG. 2 is a flowchart showing an image processing procedure performed by the image processing unit 14.

The image processing unit 14 first acquires image data of one or a plurality of frames captured by the imaging devices 12a to 12n from the memory 16 in a processing step S21. Since acquisition time is recorded in each image data, there is no constraint condition in the processing order, and this image data may be captured at any time, and may not be continuous in a case of a plurality of frames.

In the following description, the processing of the present invention is described focusing on two frames captured at different time by the imaging device 12a capturing the front. Thus, similar processing may be performed on a frame acquired from another imaging device.

Next, the image processing unit 14 extracts the feature point in the acquired frame image in a processing step S22. Examples of the feature point include edges and corners in an image, and maximum and minimum values of pixel intensities. Image processing techniques, such as Canny, Sobel, FAST, Hessian, and Gaussian, can be used to extract the feature points. It is preferable that a specific algorithm is appropriately selected in accordance with a feature of the image.

Next, the image processing unit 14 tracks the same feature point extracted in the respective frame images, on the image of another frame in time series of the frame images. Techniques, such as the Lucas-Kanade method, the Shi-Tomasi method, and the Direct Matching method, can be used for tracking. It is preferable that a specific algorithm is appropriately selected in accordance with a feature of the image. Further, the tracking in a processing step S23 is not limited to the feature points of the continuous frames acquired immediately before or immediately after, but may be at intervals of several frames.

Next, in a processing step S24, the movement amounts of the feature points tracked in the processing step S23 are calculated. In the present invention, the "movement amount" means both the movement amount of the feature point and the movement amount of the moving object. Therefore, the term is distinctively used. The movement amount of the feature point is determined, for example, by calculating a difference between a pixel position of the feature point on a first image at the preceding time and a pixel position of the same feature point on a second image of another frame at the following time, the pixel positions being acquired in the tracking in the processing step S23.

In a processing step S25, the movement amount of the imaging device 12, that is, the movement amount of the moving object is estimated.

In the processing step S25, the imaging device 12 estimates the actual movement amount of the moving object 100 between the time when a certain frame is captured and the time when another frame is captured. However, another method may be used as long as the movement amount of the moving object 100 on the frame can be estimated in the end. For example, techniques, such as GPS information, odometry, image odometry, and SLAM, may be used. Further, a time-series filter (e.g. particle filter and Kalman filter) that estimates the present movement amount based on the movement amount of moving objects in the past, or a combination of the sensor information and various filters may be used.

The timing at which the processing step S25 is performed may be immediately after the processing step S24, or may be performed in parallel with the processing steps S21 to S24. The processing step S25 may be performed any time before the processing of a processing step S26 starts.

In the processing step S26, the amount of the feature point tracked in the processing step S23 and the imaging device 12 (moving object) is estimated based on the information on the movement amount of the feature point acquired in the processing step S24 and the information on the movement amount of the moving object 100 acquired in the processing step S25. Details of the processing step S26 will be described later.

Figure 3A:
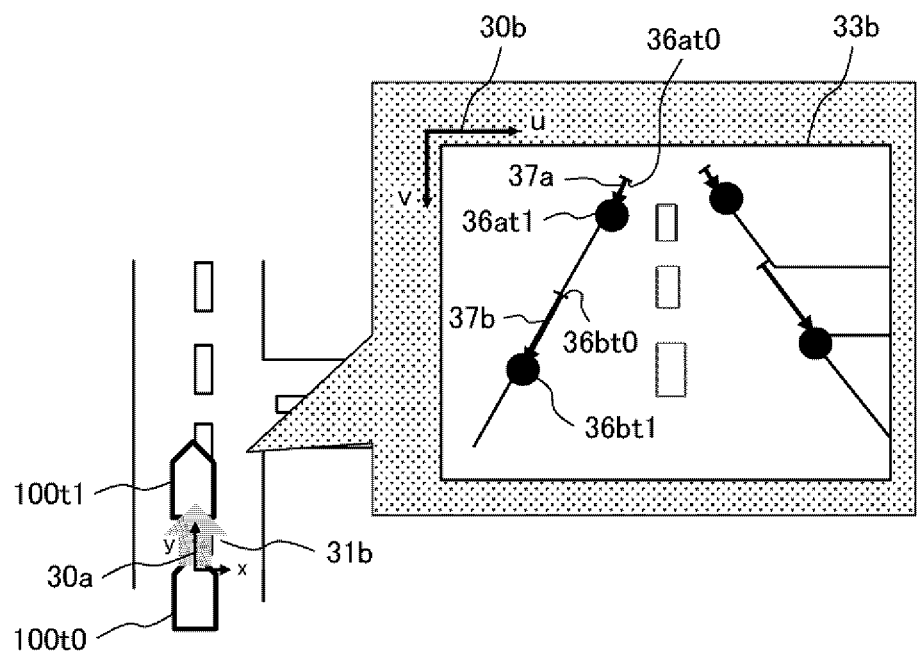
FIG. 3a is a diagram showing a relationship between an actual site (moving object travel site) and a captured frame image when a moving object 100 goes straight.
Figure 3B:
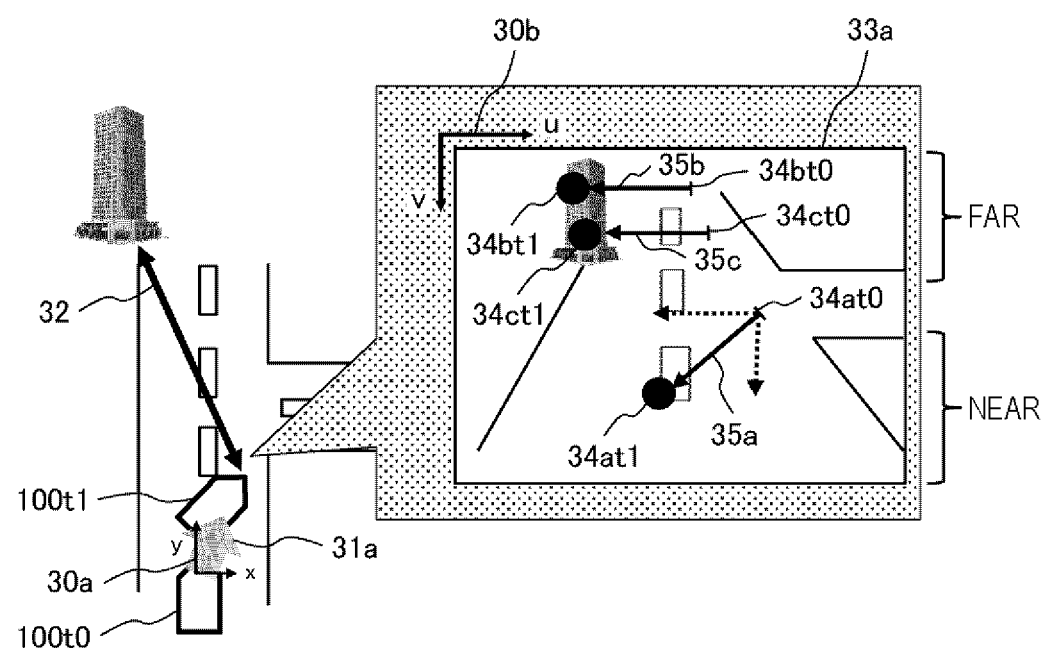
FIG. 3b is a diagram showing a relationship between an actual site (moving object travel site) and a captured frame image when the moving object 100 makes a turn.

The concept of the present invention will be described with reference to FIGS. 3*a* and 3*b*. FIGS. 3*a* and 3*b* each show an actual site (moving object travel site) in comparison to a frame image captured by the imaging device 12 mounted on the moving object. Note that the position at the actual site (moving object travel site) is represented by fixed coordinates (x, y) on the ground space of the moving object 100, and is indicated by 30*a*. Further, the position in the frame image captured by the imaging device mounted on the moving object is represented by coordinates (u, v), and is indicated by 30*b*.

FIG. 3*a* shows a relationship between the actual site (moving object travel site) and the captured frame image when the moving object 100 goes straight. In the actual site (moving object travel site), moving object positions at time t0 and t1 are 100*t*0 and 100*t*1, and a movement amount of the moving object 100 between the time t0 and t1 is indicated by 31*b*. On the other hand, in an image of a frame 33*b* that has been captured, feature point positions at time t0 of feature points set on a side of the road (a feature point 36*a* in the distance and a feature point 36*b* in proximity are shown) are 36*a*t0 and 36*b*t0. Feature point positions at time t1 are indicated by 36*a*t1 and 36*b*t1, and movement amounts of the feature points between the time t0 and t1 are indicated by 37*a* and 37*b*, respectively.

In FIG. 3*a*, the coordinates 30*a* of the actual site (moving object travel site) are fixed coordinates (x, y) on the ground space of the moving object 100. Here, for convenience and simplicity, it is assumed that the moving object 100 is on a two-dimensional plane. The movement amount 31*b* is the amount of the movement (translation) in which the moving object 100 travels. Here, for the purpose of simplicity, the movement amount 31*b* of the moving object 100 is set to (0, y).

The frame 33*b* represents one of the images captured by the imaging device 12 after the moving object 100 travels the movement amount 31*b*. The movement amounts on the image of the feature points 36*a* and 36*b* extracted in the processing steps S21 to S23 are the feature point movement amounts 37*a* and 37*b*, respectively. In FIG. 3*a*, the feature point 36*a* in an upper part of the image is at the far end of the moving object and the feature point 36*b* in a lower part of the image is near the moving object. The relationship between the feature point movement amount and the position of the image at this time is: the movement amount 37*a* (far) is smaller than the movement amount 37*b* (near).

FIG. 3*b* shows a relationship between an actual site (moving object travel site) and a captured frame image when the moving object 100 makes a large turn. In the actual site (moving object travel site), moving object positions at time t0 and t1 are indicated by 100*t*0 and 100*t*1, respectively, and a movement amount of the moving object 100 between the time t0 and t1 is indicated by 31*a*. On the other hand, in an image of a captured frame 33*a*, feature point positions at time t0 of feature points 34*b* and 34*c* set in the distance on the road and a feature point 34*a* in proximity set on the road are 34*b*t0, 34*c*t0, and 34*a*t0. Feature point positions at time t1 are indicated by 34*b*t1, 34*c*t1, and 34*a*t1, and movement amounts of the feature points between the time t0 and t1 are indicated by 35*b*, 35*c*, and 35*a*, respectively.

In FIG. 3*b*, the movement amount 31*a* of the moving object at the actual site (moving object travel site) is (x, y, yaw). Note that a turning component of the moving object 100 is represented as yaw. Here, the distance 32 is a distance from a position after the moving object 100 travels the movement amount 31*a* to a three-dimensional object located far away. The frame 33*a* is one of the images that the imaging device 12 captures after the moving object 100 travels the movement amount 31*a*. The coordinates 30*b* are coordinates (u, v) on the frame 33*a*, and the movement amounts, on the image, of the feature points 34*a*, 34*b*, and 34*c* extracted in the processing steps S21 to S23 are indicated by the movement amounts 35*a*, 35*b*, and 35*c* of the feature points, respectively.

After the moving object 100 travels the movement amount 31*a*, the movement amount 35*a* of the feature point 34*a* near the moving object on the image has a large u-axis component and a large v-axis component. However, the movement amounts 35*b* and 35*c* of the feature points 34*b* and 34*c* have a large u-axis component, and a smaller v-axis component compared with the u-axis component. Further, the three-dimensional object from which the feature point 34*a* is extracted is closer to the moving object 100 than the three-dimensional object from which the feature points 34*b* and 34*c* are extracted. Therefore, it is represented that, on the image, the movement amount 35*a* (v-axis component) is larger than the movement amount 35*b* (v-axis component), and the movement amount 35*a* (v-axis component) is larger than the movement amount 35*c* (v-axis component).

In the above, the relationship between the actual site (moving object travel site) and the captured frame image has been described for the case of going straight with reference to FIG. 3*a* and for the case of turning with reference to FIG. 3*b*. This will lead to the following. First, the influence of the movement amount 31*a* of the moving object 100 received by the feature point in the distance and the influence of the movement amount 31*a* of the moving object 100 received by the feature point in proximity are different. The movement amount 35*b* (u-axis component) and the movement amount 35*c* (u-axis component) of the feature point 34*b* and the feature point 34*c* in the distance on the image are largely dependent on the turning component yaw of the moving object 100. Thus, the movement amount 35*a* of the feature point 34*a* in proximity on the image is largely dependent on (x, y, yaw) of the moving object 100.

Therefore, the movement amount of the approximate feature point can be estimated by the movement amount of the moving object 100 and the feature point position on the image (distance from the moving object: far or near), and a component with less influence of noise on the image is identified.

Figure 4:
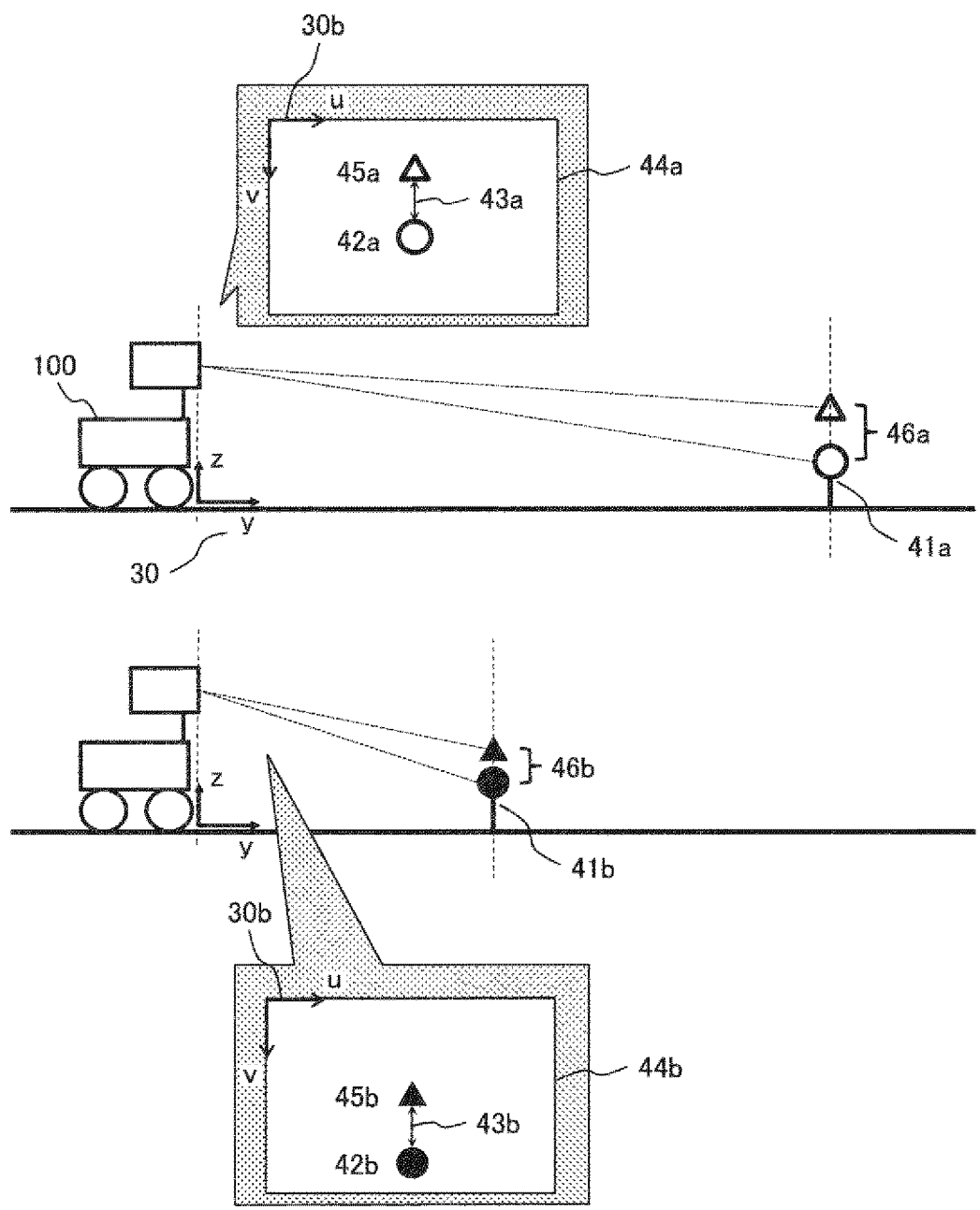
FIG. 4 is a diagram describing a distance to an object and an influence of an error on the image.

FIG. 4 is a diagram describing an influence on a distance to an object due to an error (e.g. noise) on the image. The upper side of FIG. 4 shows an object 41*a* in the distance and a frame 44*a* captured at this time. The lower side of FIG. 4 shows an object 41*b* near the frame and a frame 44*b* captured at this time. In the coordinates 30*a* of the actual site (moving object travel site), a height direction of the moving object is represented by Z.

In FIG. 4, in the frames 44*a* and 44*b*, feature points extracted from the objects 41*a* and 41*b* in the processing step S22 and including no error are represented as 42*a* and 42*b*. Here, when the feature points are tracked in the processing step S23, errors 43*a* and 43*b* occur at the position of the feature points, and the feature points 42*a* and 42*b* become points 45*a* and 45*b*. For the purpose of simplicity, the influence of the error 43 is described only in the vertical direction. However, a movement in other directions is possible.

When the errors 43*a* and 43*b* on the images are converted into the height direction of the fixed coordinates 30*a* on the ground space of the moving object 100, the positions are 46a and 46b apart, as errors, from the actual positions of the feature points 42a and 42b.

According to these drawings, the measurement errors 46a and 46b at the actual sites (moving object travel site) increase in proportion to the distance from the moving object, and the error 46a is larger than the error 46b. Therefore, it is understood that the error is affected more as the distance from the moving object is longer.

Figure 5:
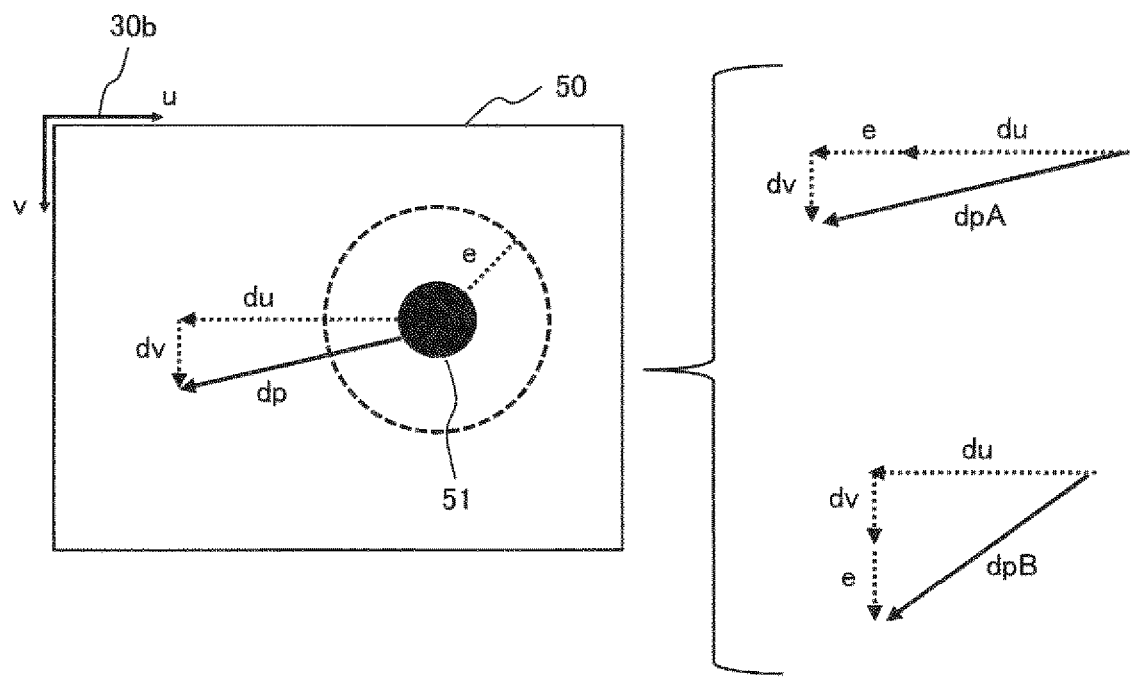
FIG. 5 is a diagram describing a relationship between an estimated distance and a movement amount of a feature point on the image.

FIG. 5 is a diagram showing the relationship between the estimated distance from the moving object to an object and the movement amount of the feature point on the image. In FIG. 5, an image 50 is an image acquired in the processing step S21, and a feature point 51 is a feature point extracted in the processing step S22. When a movement amount on the image 50 after the feature point 51 is tracked in the processing step S23 is dp, the movement amount dp can be recognized separately as du in the u direction and dv in the v direction with respect to the coordinates 30b.

Further, an error that occurs after the feature point 51 is tracked in the processing step S23 is e. Here, the error e is distributively dispersed in the u direction and the v direction, and the influence on each direction becomes unknown. When the error e influences the u direction, the error e is added to du in the u direction, the movement amount dp becomes a movement amount dpA as in Equation (1). When the error e influences the v direction, the error e is added to dv in the v direction, and the movement amount dp becomes a movement amount dpB as in Equation (2).

[Equation 1]

$$dpA = \mathrm{sqrt}(dv^2 + (du+e)^2) \qquad (1)$$

[Equation 2]

$$dpB = \mathrm{sqrt}(du^2 + (dv+e)^2) \qquad (2)$$

As shown in FIG. 4, even when the error e is constant, the distance to the object increases the error with respect to the coordinates 30. Further, according to the description of FIGS. 3a and 3b, when the moving object translates, the movement amount of the near object on the image is large, while the movement amount of the distant object on the image is small. Therefore, when the movement amount on the image is small, the error e is approached, and thus the error of the distance estimated by the movement amount is large. For example, in FIG. 5, since du is larger than dv, the ratio of the error e to (e+du) is small. In contrast, the ratio of the error e to (e+dv) is large. Therefore, it is understood that the error is small when the distance is estimated in the direction in which the movement amount of the feature point having the large movement amount is large.

Figure 6A:
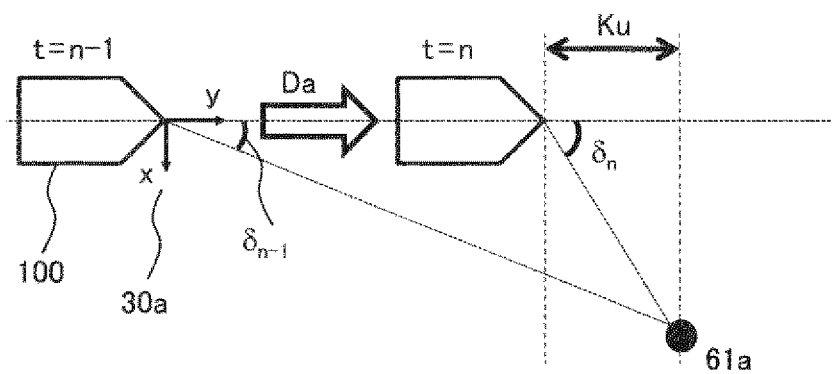
FIG. 6a is a diagram describing a distance estimation method using only a movement amount in a u direction as a method of estimating the movement amount of the moving object with the movement amount of the feature point divided into two directions.
Figure 6B:
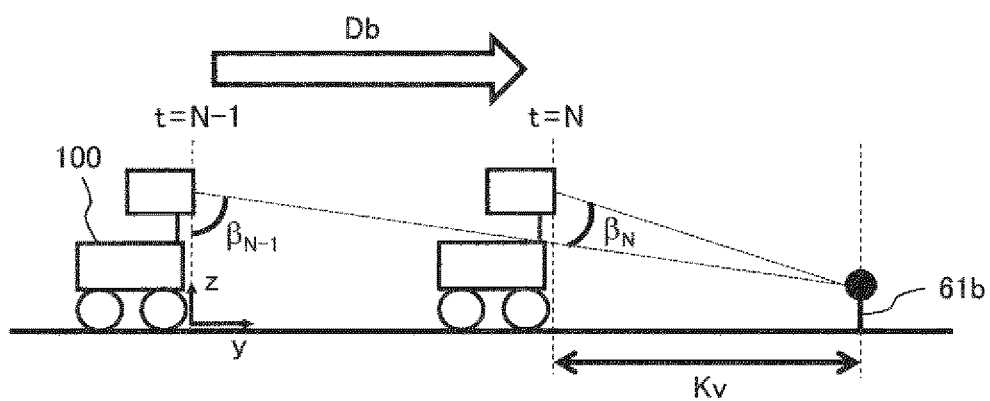
FIG. 6b is a diagram describing a distance estimation method using only a movement amount in a v direction as a method of estimating the movement amount of the moving object with the movement amount of the feature point divided into two directions.

FIGS. 6a and 6b are diagrams describing details of the processing step S26 when the distance is estimated with the movement amount of the feature point divided into the u direction and the v direction. In FIGS. 6a and 6b, in order to simplify the description, an installation angle of the imaging device 12 is horizontal, the u axis direction on the image and the x direction of the coordinates 30a coincide, and the v axis direction on the image and the z direction of the coordinates 30a coincide. However, actually, each of the plurality of imaging devices 12 has a different installation position, angle, and direction. That is, the directions and the numbers into which the movement amount is divided vary depending on the situation.

A distance estimation method using only the movement amount in the u direction will be described with reference to FIG. 6a. The moving object 100 travels a movement amount Da from a position at time $t=t_{n-1}$ to a position at time $t=t_n$, and in the processing step S23, tracks the feature points extracted from an object 61a in the processing step S22. Here, an angle relative to the object 61a at time $t=t_{n-1}$ is an angle and the angle relative to the object 61a at time $t=t_n$ is an angle $_n$. A distance Ku from the position at the time $t=t_n$ to the object 61a can be calculated from the geometrical relationship in Equation (3). Here, the movement amount Da is the movement amount estimated in the processing step S25.

[Equation 3]

$$Ku = Da \times \tan(\delta_{n-1})/(\tan(\delta_n) - \tan(\delta_{n-1})) \qquad (3)$$

A distance estimation method using only the movement amount in the v direction will be described with reference to FIG. 6b. The moving object 100 travels a movement amount Db from a position at time $t=t_{N-1}$ to a position at time $t=t_N$, and in the processing step S23, tracks the feature points extracted from an object 61b in the processing step S22. An angle in the v direction with respect to the object 61b at time $t=t_{N-1}$ is an angle $_{N-1}$, and the angle in the v direction with respect to the object 61b at time $t=t_N$ is an angle N. A distance Kv from the position at the time $t=t_N$ to the object 61b can be calculated from the geometrical relationship by Equation (4). Here, the movement amount Db is the movement amount of the moving object estimated in the processing step S25.

[Equation 4]

$$Kv = Db \times \tan(\beta_{N-1})/(\tan(\beta_N) - \tan(\beta_{N-1})) \qquad (4)$$

The angles $_n$, $_{n-1}$, $_N$, $_{N-1}$ of Equations (3) and (4) can be calculated by, for example, the methods of Equations (5) and (6). Here, W is a size of the image captured by the imaging device 12 in the u direction. V is the maximum size in the v direction. FOVu and FOVv are the maximum angles at which the imaging device 12 can capture an image in the u and v directions, respectively.

[Equation 5]

$$\delta n = \mathrm{atan}\,[\{(W - 2 \times u) \times \tan(\mathrm{FOV}u/2)\}/W] \qquad (5)$$

[Equation 6]

$$\beta N = \mathrm{atan}\,[\{(V - 2 \times v) \times \tan(\mathrm{FOV}v/2)\}/V] \qquad (6)$$

Each of the distance Ku and the distance Kv calculated here is weighted to calculate a corrected distance K. As described in FIG. 5, the accuracy of the estimated distance depends on the position of the feature point, the movement amount, and the direction of the movement on the image. When the magnitude of the movement amount is simply taken into consideration, the movement amounts du and dv in the u and v directions may be weighted as shown in Equation (7).

[Equation 7]

$$K = (Ku \times du + Kv \times dv)/(du + dv) \qquad (7)$$

Further, as shown in Equation (8), the weights of the movement amounts du and dv may be adjusted by parameters m=1, 2, 3 . . . .

[Equation 8]

$$K = (Ku \times du^m + Kv \times dv^m)/(du^m + dv^m) \qquad (8)$$

Further, K may be calculated from the average of Ku and Kv without using the movement amounts du and dv as weights, or, as shown in Equation (9), the weight in the short direction of the movement amount may be set to 0 for switching to Ku and Kv.

[Equation 9]

$$K=Ku, \text{ if } du>dv$$
$$Kv, \text{ if } du<dv \quad (9)$$

Further, pixel $(U, V)_n$ at the time $t=t_n$ may be estimated using the movement amount of the moving object 100 estimated in the processing step S25 and the distance estimated as pixel $(u, v)_{n-1}$ at the time $t=t_{n-1}$. Then, by comparing the estimated pixel $(U, V)_n$ with pixel $(u, v)_n$ at the actual time $t=t_n$, Ku and Kv may be selected or weighted. The pixel $(U, V)_n$ is obtained by Equation (10). Here, R and T are matrices representing the movement amounts (translation and turn) of the moving object 100 estimated in the processing step S25, and $P_{n-1}$ and $P_n$ are matrices that convert pixels at time $t=t_{n-1}$ and time $t=t_n$, respectively into meters.

[Equation 10]

$$(U,V)_n = P_{n-1} \times R \times T \times P_{n-1} \times (u,v)_{n-1} \quad (10)$$

The estimated pixel $(U, V)_n$ is determined and compared with the actual pixel $(u, v)_n$ at the time $t=t_n$ to determine an error in the u and v directions, and then the distances Ku and Kv in the u and v directions are weighted.

Equation (11) represents a case of selecting the distance estimated in the direction having a small error. This "selection" is equivalent to setting the distances Ku and Kv weights to 1, 0 or 0, 1 respectively.

[Equation 11]

$$K=Ku, \text{ if } \text{abs}(V_n-v_n)>\text{abs}(U_n-u_n)$$
$$Kv, \text{ if } \text{abs}(V_n-v_n)<\text{abs}(U_n-u_n) \quad (11)$$

Alternatively, as shown by Equation (12), the distance Ku and the distance Kv may be effectively determined using a parameter G representing a prediction error of the feature point tracked in the processing step S23. The prediction error of the feature point can be set based on, for example, the movement amount of the moving object 100. For example, when the moving object 100 moves at high speed, the tracking of the feature point is likely to fail in the processing step S23. Therefore, G may be set high in accordance with the speed of the movement of the moving object 100. Further, the prediction error of the feature point can be set based on the position of the feature point on the image. When the position on the image is in a lower part, the movement amount of the feature point near the imaging device 12 becomes large and the error becomes relatively small. Therefore, G may be set smaller as the position is in a lower part.

[Equation 12]

$$K=Ku, \text{ if } G<dvKv, \text{ if } G<du \quad (12)$$

A plurality of methods described above is combined, or images captured by different imaging devices 12 and time-series information tracking the same feature point at different image acquisition timings are combined. Thereby, the distance to the object can be estimated with high accuracy using a combination pattern with less influence of an error depending on the situation.

Here, in order to measure the distance of the same object with the different imaging devices 12, the position, the direction, and the angle of view, for example, may be set, such that the plurality of different imaging devices 12 can capture the same area while the moving object is moving.

Figure 7:
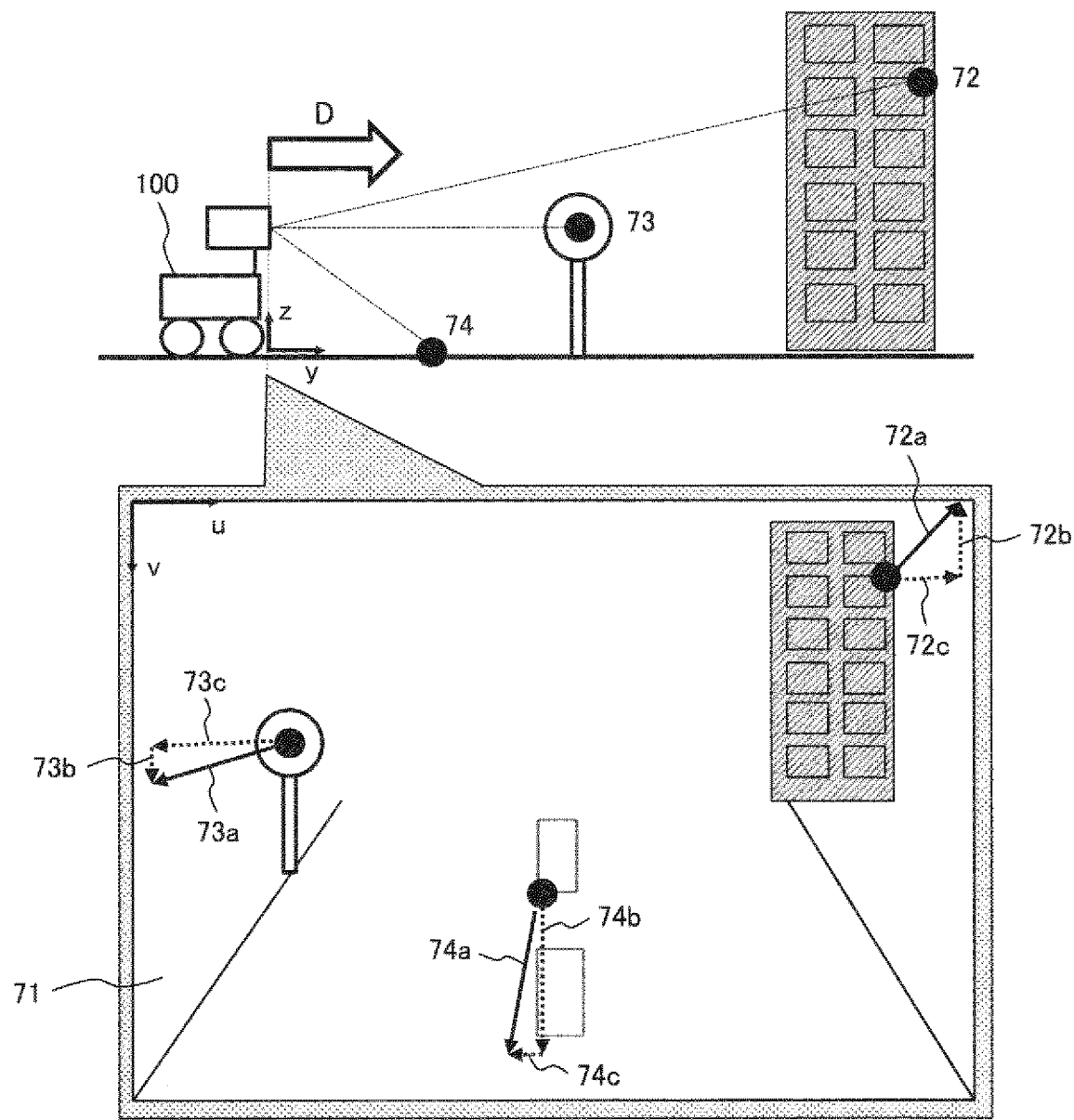
FIG. 7 is a diagram describing an example of the feature point on the image.

FIG. 7 is a diagram describing an example of feature points and an example of processing of the feature points. In the drawing, the movement amount D is the movement amount in which the moving object 100 travels, and an image 71 is an image acquired in the processing step S21 before the moving object 100 travels the movement amount D. A feature point 72 is an example of a high place in a distance, such as a building, a feature point 73 is an example of a near solid object, such as a sign, and a feature point 74 is an example of a feature point on a near road surface, such as road surface paint. Since the feature points are present everywhere, the "object" for measuring the distance according to the present invention represents the "surrounding object" of the moving object, and is not limited to the structure itself, such as a sign, but also includes a part of structures and natural objects, such as a crack or a pattern of a road surface. The feature points 72, 73, and 74 are extracted in the processing step S22, and tracked to the image acquired at another timing in the processing step S23. Then the movement amount is calculated in the processing step S24. Movement amounts 72a, 73a, and 74a are movement amounts on the image of the feature points 72, 73, and 74, respectively, calculated at the processing step S24. Movement amounts in the u and v directions of the movement amounts 72a, 73a, and 74a are movement amounts 72b, 73b, and 74b and movement amounts 72c, 73c, and 74c, respectively.

Since an installation height and angle of the imaging device 12 are known, the movement amount of the moving object in the processing step S25 can be estimated from the distance to the feature point extracted from the road surface. Therefore, in FIG. 7, the movement amount D of the moving object 100 can be estimated by the image odometry technique using the feature point 74 extracted from the road surface.

When the distance between the feature points 72 and 73 is estimated in the processing step S26, for example, the distance is estimated using the movement amounts 72b, 73b, 72c, and 73c, which are the movement amounts divided into the u and v directions of the feature points 72 and 73, respectively. Here, as an example, Ku and Kv of the respective feature points are calculated by Equations (3) and (4), and Ku and Kv calculated at the respective feature points are combined by Equation (7), for example. The movement amounts of the feature points, extracted in the processing step S22, in the u and v directions are weighted. Since the feature points 72 and 73 have different positions on the image 71, the proportions of movement amounts in the u and v directions are different. For example, in the example of FIG. 7, the movement amount 73c is larger than the movement amount 73b, and the movement amount 72c, the movement amount 72b.

Here, since the weight of Ku calculated by the movement amount 73c is thus larger than the weight of Kv calculated by the movement amount 73b, the distance K to the feature point 73 becomes a value close to Ku. On the other hand, since the weight of Ku calculated by the movement amount 72c is not very different from the weight of Kv calculated by the movement amount 72b, the distance K to the feature point 72 becomes a value close to the average of Kv and Ku. Further, since the feature point 73 is closer to the moving object 100 than the feature point 72, the movement amount 73a is larger than the movement amount 72a, and the distance to the feature point 73 can be estimated with higher accuracy.

The above-described distance estimation apparatus 1 according to the present invention estimates a distance from the moving object 100 to the feature points 34 and 36 on the image 33 using the image from the imaging device 14 mounted on the moving object 100. The distance estimation apparatus 1 includes the first means S22, the second means S23, the fourth means S24, the fifth means S25, and the sixth means S26. The first means S22 sets one or a plurality of feature points on the image acquired from the imaging device 14 at the first timing. The second means S23 detects the feature point set at the first means on the image acquired from the imaging device at the second timing. The fourth means S24 determines the movement amount of the feature point on the image between the first timing and the second timing. The fifth means S25 determines the movement amount of the moving object between the first timing and the second timing. The sixth means S26 estimates the distance from the moving object to the feature point based on the movement amount on the image and the movement amount of the moving object between the first timing and the second timing.

Further, in the present invention, the movement amount on the image is divided into a plurality of directions, and a distance to the feature point is estimated based on the movement amount of the feature points of each of the plurality of directions on the image. The distance to the feature point is estimated using, as a major factor, a larger movement amount among the movement amounts of the feature points in the respective directions divided into the plurality of directions.

Here, specific examples of methods to use the movement amount as the major factor include adopting a larger estimated distance, determining the distance by weight, and considering an error.

REFERENCE SIGNS LIST 1 position estimation device
12 imaging device
13 information processing device
14 image processing unit
15 control unit
16 memory
17 display unit
100 moving object
30a, 30b coordinates
33a, 33b, 44a, 44b frame
34a, 34b, 36a, 36b feature point
31a, 31b, 35a, 35b, 35c, 37a, 37b movement amount
43a, 43b error

The invention claimed is:

1. A distance estimation apparatus, comprising:
a first means that sets a feature point on a first image acquired from the imaging device at a first timing;
a second means that detects the feature point set at the first means on a second image acquired from the imaging device at a second timing;
a fourth means that determines a movement amount of the feature point between the first image and the second image between the first timing and the second timing;
a fifth means that determines a movement amount of a moving object between the first timing and the second timing; and
a sixth means that estimates a distance from the moving object to the feature point based on the movement amount between the first image and the second image and the movement amount of the moving object between the first timing and the second timing,
wherein the sixth means divides the movement amount into a plurality of directions and estimates the distance to the feature point based on the movement amount of the feature point in each of the directions, and
wherein the sixth means estimates the distance to the feature point in each of the plurality of directions and estimates the distance to the feature point by combining a plurality of the distances estimated in the plurality of directions.

2. The distance estimation apparatus according to claim 1, wherein, for estimation of the distance, the sixth means determines the distance by weight based on the movement amount of the feature point in the plurality of directions.

3. The distance estimation apparatus according to claim 1, wherein, for estimation of the distance, the sixth means estimates a position error of the feature point on the image, adjusts a combination parameter based on the estimated error, and estimates the distance based on the distance estimated in the plurality of directions and the adjusted parameter.

4. The distance estimation apparatus according to claim 1, wherein the combination of the plurality of estimated distances is determined based on the movement amount of the moving object and/or a position of the feature point between the first image and the second image.

5. The distance estimation apparatus according to claim 1, wherein the moving object includes a plurality of the imaging devices, and the plurality of imaging devices having different installation conditions captures a same object surrounding the moving object to estimate a distance from the moving object to the surrounding object.

6. The distance estimation apparatus according to claim 1, wherein the sixth means estimates the distance to the feature point using, as a major factor, a larger movement amount among the movement amounts of the feature point in the respective directions divided into the plurality of directions.

7. A distance estimation method, comprising:
setting a feature point on a first image acquired from the imaging device at a first timing;
detecting the feature point on a second image acquired from the imaging device at a second timing;
determining a movement amount of the feature point between the first image and the second image between the first timing and the second timing;
determining a movement amount of a moving object between the first timing and the second timing;
estimating a distance from the moving object to the feature point based on the movement amount between the first image and the second image and the movement amount of the moving object between the first timing and the second timing; and
estimating the distance to the feature point using, as a major factor, a larger movement amount among the movement amounts of the feature point in the respective directions divided into the plurality of directions.

8. The distance estimation method according to claim 7, comprising dividing the movement amount on the image into a plurality of directions and estimating the distance to the feature point based on the movement amount of the feature point.

* * * * *